United States Patent [19]
Scoggins

[11] 3,876,592
[45] Apr. 8, 1975

[54] ARYLENE SULFIDE POLYMERS
[75] Inventor: Lacey E. Scoggins, Bartlesville, Okla.
[73] Assignee: Phillips Petroleum Company, Bartlesville, Okla.
[22] Filed: Nov. 19, 1973
[21] Appl. No.: 416,775

[52] U.S. Cl. .................................. 260/79.1; 260/79
[51] Int. Cl. ............................................. C08g 23/00
[58] Field of Search ............................. 260/79, 79.1

[56] References Cited
UNITED STATES PATENTS
3,354,129  11/1967  Edmonds, Jr. et al. ............ 260/79.1
3,538,166  11/1970  Campbell et al. ................ 260/609 E Primary Examiner—Melvyn I. Marquis

[57] ABSTRACT

A method of producing arylene sulfide polymers employing polyhalo-substituted aromatic compounds, phosphorus pentasulfide, bases selected from the hydroxides of lithium, sodium, potassium, rubidium, cesium, magnesium, calcium, strontium and barium and the carbonates of sodium, potassium, rubidium and cesium and phosphoramides such as hexamethylphosphoramide.

14 Claims, No Drawings

ARYLENE SULFIDE POLYMERS

This invention pertains to the production of arylene sulfide polymers.

In one of its more specific aspects, this invention pertains to a novel method of producing polymers such as those produced by the method of U.S. Pat. No. 3,354,129.

In U.S. Pat. No. 3,354,129, the disclosure of which is incorporated herein by reference, there is disclosed a method of producing polymers from polyhalo-substituted aromatics, alkali metal sulfides and polar organic compounds. There has now been discovered another method of preparing arylene sulfide polymers.

In accordance with one embodiment of the present invention, arylene sulfide polymers are produced by reacting at least one polyhalo-substituted aromatic compound with a mixture in which phosphorus pentasulfide, at least one base selected from the hydroxides of lithium, sodium, potassium, rubidium, cesium, magnesium, calcium, strontium and barium and the carbonates of sodium, potassium, rubidium and cesium and at least one organic phosphoramide are contacted.

Organic phosphoramides which can be employed in the process of this invention can be represented by the formula $(R_2N)_3PO$, wherein each R is selected from alkyl radicals having 1 to about 4 carbon atoms, with the proviso that two R groups attached to the same nitrogen atom in each of one, two, or three $R_2N$ groups per molecule can be an alkylene radical having about 3 to about 5 carbon atoms.

Examples of some organic phosphoramides which can be employed in the process of this invention include hexamethylphosphoramide, hexaethylphosphoramide, hexapropylphosphoramide, hexaisopropylphosphoramide, hexabutylphosphoramide, hexa-sec-butylphosphoramide, N,N′N″-tri(trimethylene)phosphoramide, N,N′,N″-tri(tetramethylene)phosphoramide, N,N′,N″-tri(pentamethylene)phosphoramide, N,N,N′,N′-tetramethyl-N″,N″-diisobutylphosphoramide, N-methyl-N-ethyl-N′,N″-di(pentamethylene)phosphoramide, and the like, and mixtures thereof.

The polyhalo-substituted aromatic compounds which can be employed in the method of this invention are compounds in which the halogen atoms are attached to aromatic ring carbon atoms. Suitable compounds include 1,2-dichlorobenzene, 1,3-dichlorobenzene, 1,4-dichlorobenzene and other polyhalo-substituted aromatic compounds described and exemplified in the aforementioned U.S. Pat. No. 3,354,129. If desired, mixtures of polyhalo-substituted aromatic compounds can be employed.

Bases which can be employed in the method of this invention include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate and mixtures thereof. If desired, the hydroxide can be produced in situ by the reaction of the corresponding oxide and water.

The organic phosphoramides used in the method of this invention should be substantially liquid at the reaction temperatures and pressures employed.

Although the ratio of polyhalo-substituted aromatic compound to phosphorus pentasulfide can vary to a considerable extent, the polyhalo-substituted aromatic compound generally will be employed in an amount within the range of about 4 to about 6, preferably about 4.5 to about 5.5, gram-moles per gram-mole of phosphorus pentasulfide ($P_2S_5$). Although the amount of base employed can vary over a wide range, the base generally will be used in an amount within the range of about 5 to about 25, preferably about 9 to about 20, gram-equivalents per gram-mole of phosphorus pentasulfide. As used herein, one gram-equivalent of the hydroxides of magnesium, calcium, strontium, and barium represents the same amount as one-half gram-mole of these substances, whereas for the hydroxides of lithium, sodium, potassium, rubidium, and cesium, or for the carbonates of sodium, potassium, rubidium, and cesium, the amount represented by one gram-equivalent is considered to be the same as that represented by one gram-mole. The amount of organic phosphoramide employed also can vary widely but generally will be within the range of about 100 grams to about 2500 grams per gram-mole of polyhalo-substituted aromatic compound used.

The temperature at which the reaction can be conducted can vary over a wide range but generally will be within the range of about 125°C. to about 450°C., preferably within the range of about 175°C. to about 350°C. The reaction time can vary considerably, depending in part on the reaction temperature, but generally will be within the range of about 10 minutes to about 3 days, preferably about 1 hour to about 8 hours. The pressure need be only sufficient to maintain the polyhalo-substituted aromatic compound and the organic phosphoramide substantially in the liquid phase and to retain the sulfur source therein.

The components used in the preparation of the arylene sulfide polymer can be introduced into contact in any order. Water which can be present in any composite formed from any of the preceding compounds, for example, the composite first formed, or which can be added to the composite first formed, can be removed, for example, by distillation prior to conducting the polymerization reaction. Such water can be present as an impurity, as a solvent or diluent or as water of hydration. Regardless of whether a water removal step is employed, at least a portion of the composition formed from the polyhalo-substituted aromatic compound, the phosphorus pentasulfide, the base and the organic phosphoramide is maintained at polymerization conditions to produce the arylene sulfide polymer.

The arylene sulfide polymers produced by the method of this invention can be separated from the reaction mixture by conventional procedures, for example, by filtration of the polymer followed by washing with water, or by dilution of the reaction mixture with water, followed by filtration and water washing of the polymer.

The arylene sulfide polymers prepared by the process of this invention can be blended with fillers, pigments, extenders, other polymers and the like. They can be cured through crosslinking and/or chain extension, for example, by heating at temperatures up to about 480°C. in the presence of a free oxygen-containing gas, to provide cured products having high thermal stability and good chemical resistance. They are useful in the production of coatings, films, molded objects and fibers.

It is within the scope of the invention to bring the polyhalo-substituted aromatic compound, the organic phosphoramide, the base and the phosphorus pentasulfide into contact in any order.

Also, it is within the scope of this invention to remove water from any combination of the aforesaid compounds.

The foregoing statements are based upon the following examples. In these examples, values for inherent viscosity were determined at 206°C. in 1-chloronaphthalene at a polymer concentration of 0.4 g/100 ml. solution.

EXAMPLE I

A solution containing 89.2 g (0.404 gram-mole) phosphorus pentasulfide dissolved in 719 g of hexamethylphosphoramide was charged to a stirred reactor with 163 g (4.03 gram-moles) sodium hydroxide and 200 g of deaerated water. The mixture was dehydrated by distillation under a slight nitrogen sweep until the reactor temperature reached 200°C. Distillate in the amount of 165 g was collected.

Into the reactor was introduced a solution of 298 g (2 gram-moles) of 1,4-dichlorobenzene in 154 g hexamethylphosphoramide under nitrogen pressure. Nitrogen flow into the reactor was continued until the reactor pressure was 130 psig.

The temperature of the reactor was increased to 250°C. and the reactor was maintained at this temperature for 2 hours, 10 minutes, at which time the pressure had risen to 300 psig. The reactor and its contents were then allowed to cool.

The contents of the reactor were mixed and agitated with 2 liters of water and filtered. The solids collected were washed 4 times with hot water and the polymer remaining was vacuum dried 16 hours at 100°C. Poly(p-phenylene sulfide) in the amount of 63 g (29.2% yield) having an inherent viscosity of 0.01 was recovered.

EXAMPLE II

A reactor was charged with 46.6 g (0.2 gram-mole) phosphorus pentasulfide dissolved in 512 g hexamethylphosphoramide, 112 g (2.8 gram-moles) sodium hydroxide, 147 g (1 gram-mole) 1,4-dichlorobenzene, and 36 g deaerated water. The mixture was heated to 250°C. and held at that temperature for 3 hours, during which period the reactor pressure increased from 220 psig to 540 psig.

The reactor was allowed to cool and the polymer was removed from the reactor and water washed and vacuum dried as in Example I.

Poly(p-phenylene sulfide) in an amount of 63 g (58.4% yield) having an inherent viscosity of 0.05 was recovered. The infrared spectrum of this polymer was consistent with that of poly(p-phenylene sulfide) produced in accordance with the process of U.S. Pat. No. 3,354,129.

The above examples demonstrate the method of carrying out the invention, with and without removal of water prior to production of the arylene sulfide polymer.

It will be apparent from the foregoing that various modifications can be made to the method of this invention. Such are considered, however, to be within the scope of the invention.

What is claimed is:

1. A method of producing a polymer which comprises:
   a. forming a composition by contacting at least one polyhalo-substituted aromatic compound wherein the halogen atoms are attached to aromatic ring carbon atoms, at least one base selected from the hydroxides of lithium, sodium, potassium, rubidium, cesium, magnesium, calcium, strontium, and barium and the carbonates of sodium, potassium, rubidium and cesium, phosphorus pentasulfide and at least one organic phosphoramide having the formula $(R_2N)_3PO$, wherein each R is selected from alkyl radicals having 1 to about 4 carbon atoms, with the proviso that two R groups attached to the same nitrogen atom in each of one, two or three $R_2N$ groups per molecule can be an alkylene radical having about 3 to about 5 carbon atoms; and
   b. maintaining at least a portion of said composition at polymerization conditions to produce said polymer.

2. The method of claim 1 in which said organic phosphoramide is selected from the group consisting of hexamethylphosphoramide, hexaethylphosphoramide, hexapropylphosphoramide, hexaisopropylphosphoramide, hexabutylphosphoramide, hexa-sec-butylphosphoramide, N,N'N''-tri(trimethylene)phosphoramide, N,N',N''-tri(tetramethylene)phosphoramide, N,N',N''-tri(pentamethylene)phosphoramide, N,N,N',N'-tetramethyl-N'',N''-diisobutylphosphoramide, and N-methyl-N-ethyl-N',N''-di(pentamethylene)phosphoramide.

3. The method of claim 1 in which said polyhalo-substituted aromatic compound is employed in an amount of from about 4 to about 6 gram-moles per gram-mole of phosphorus pentasulfide.

4. The method of claim 1 in which said organic phosphoramide is employed in an amount within the range of from about 100 to about 2500 grams per gram-mole of polyhalo-substituted aromatic compound.

5. The method of claim 1 in which water is removed from said composition prior to maintaining said composition at said polymerization conditions.

6. A method of producing a polymer which comprises:
   a. forming a composition by contacting phosphorus pentasulfide, at least one base selected from the hydroxides of lithium, sodium, potassium, rubidium, cesium, magnesium, calcium, strontium and barium and the carbonates of sodium, potassium, rubidium and cesium and at least one organic phosphoramide having the formula $(R_2N)_3PO$, wherein each R is selected from alkyl radicals having 1 to about 4 carbon atoms, with the proviso that two R groups attached to the same nitrogen atom in each of one, two or three $R_2N$ groups per molecule can be an alkylene radical having about 3 to about 5 carbon atoms to form a first composition;
   b. contacting at least a portion of said first composition with a polyhalo-substituted aromatic compound wherein the halogen atoms are attached to aromatic ring carbon atoms to form a second composition; and
   c. maintaining at least a portion of said second composition at polymerization conditions to produce said polymer.

7. The method of claim 6 in which said organic phosphoramide is selected from the group consisting of hexamethylphosphoramide, hexaethylphosphoramide, hexapropylphosphoramide, hexaisopropylphosphoramide, hexabutylphosphoramide, hexa-sec-butylphosphoramide, N,N'N''-tri(trimethylene)phosphoramide, N,N'N''-tri(tetramethylene)phosphoramide, N,N',N''-tri(pentamethylene)phosphoramide, N,N,N',N'-tetramethyl-N'',N''-diisobutylphosphoramide, and N-methyl-N-ethyl-N',N''-di(pentamethylene)phosphoramide.

8. The method of claim 6 in which said polyhalo-substituted aromatic compound is employed in an amount of from about 4 to about 6 gram-moles per gram-mole of phosphorus pentasulfide.

9. The method of claim 6 in which said organic phosphoramide is employed in an amount within the range of about 100 to about 2500 grams per gram-mole of polyhalo-substituted aromatic compound.

10. The method of claim 6 in which water is removed from said first composition prior to maintaining said second composition at said polymerization conditions.

11. The method of claim 3 in which said base is employed in an amount within the range of from about 5 to about 25 gram-equivalents per gram-mole of phosphorus pentasulfide.

12. The method of claim 8 in which said base is employed in an amount within the range of from about 5 to about 25 gram-equivalents per gram-mole of phosphorus pentasulfide.

13. The method of claim 1 in which said polyhalo-substituted aromatic compound is 1,4-dichlorobenzene, said base is sodium hydroxide and said organic phosphoramide is hexamethylphosphoramide.

14. The method of claim 6 in which said polyhalo-substituted aromatic compound is 1,4-dichlorobenzene, said base is sodium hydroxide and said organic phosphoramide is hexamethylphosphoramide.

* * * * *